UNITED STATES PATENT OFFICE.

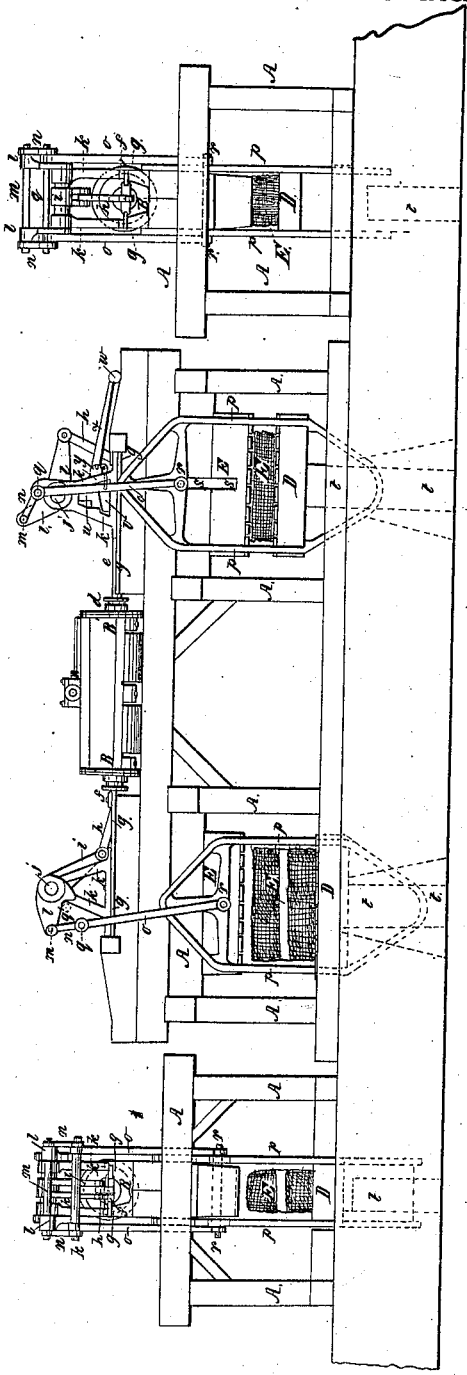
A. C. Jones,
Cotton Press,
Nº 4,942. Patented Jan. 26, 1847.

A. C. JONES, OF NEW ORLEANS, LOUISIANA.

IMPROVEMENT IN STEAM-PRESSES.

Specification forming part of Letters Patent No. 4,942, dated January 26, 1847.

*To all whom it may concern:*

Be it known that I, ALFRED C. JONES, civil engineer, of the city of New Orleans, in the State of Louisiana, have made a new and useful improvement in the manner of constructing a press for compressing bales of cotton or other substances requiring such treatment; and I do hereby declare that the following is a full and exact description thereof.

I denominate my press the "balanced steam-press" for compressing cotton, which I construct as follows: Upon a suitable frame I place a steam-cylinder, so as to stand horizontally. From each end of this cylinder proceeds a piston-rod passing through stuffing-boxes in its heads in the ordinary way, the piston being made fast to the middle of these double rods. Each of the pistons carries a cross-head that slides back and forth between horizontal guides. To each of the cross-heads a connecting-link is attached, which gives motion to a system of combined levers and rods, by which a follower is raised toward a head-block or bed-piece. The bale to be pressed is to be placed upon one of the followers, and by a stroke of the piston the pressure is effected. The bale is then secured in the usual manner, and while this is being done a bale that is to be pressed is placed upon the follower at the other end of the press, and on reversing the action of the steam on the piston this bale will in like manner be pressed and the former liberated, and so on, alternately.

In the accompanying drawings, Figure 1 is a side elevation of my press. Fig. 2 is an end elevation showing the press before the compressing has commenced; Fig. 3, an end elevation as it appears when a bale has been compressed. Fig. 4 is a plan or top view of the instrument.

In each of these figures, where the same parts occur, they are designated by the same letters of reference.

A A is the frame of the machine.

B B' is the steam-cylinder.

D D are the followers, upon which the bales E E are to be sustained, and F F the head-blocks, between which and the followers the pressing is to be effected. The steam-chest $a$ is furnished with a valve-rod, $b$, and a hand-lever, $c$, for moving the slide-valve in the ordinary way.

$d\ d$ are stuffing-boxes for the piston-rods $e\ e$. To these are attached the cross-heads $f\ f$, that move between the guides $g\ g$. To the cross-heads are attached connecting-links $h\ h$, the other ends of which are also attached, by joint-pins, to the main arm $i$, from which motion is communicated to the parts by which the raising of the followers is to be effected. The main arm $i$ is made fast to a strong shaft, $j$, that has its bearings in the stands $k\ k$, that rise from the slides or guides $g\ g$. To the shaft $j$ are also made fast (on the outside of the stands $k\ k$) the arms $l\ l$, the form of which is distinctly seen in Fig. 1. These arms are connected at their outer ends by a shaft, $m$, and to the outer ends of this shaft are attached the short connecting-links $n$, which are jointed at their lower ends to the connecting-rods $o\ o$, which rods are also jointed at their lower ends to the follower-frame $p\ p$, on the lower part of which rests the follower D. In the position of the respective parts, as shown at the left-hand end of Fig. 1, the follower is at its greatest depression, the piston being at the opposite end of the cylinder. If steam be now introduced at the end B' of the cylinder, the main arm $i$ will be forced forward toward the outer end of the press, and will assume the position in which it is represented at the right hand, the link $h$ standing nearly vertical, as represented. The arm $l$, as it is rising, is brought into contact with a shaft, $q$, the gudgeons of which connect the links $n$ and the rods $o$ together. The place of this contact is shown by the dotted circle $q'$ at the left-hand end of Fig. 1. The result of this contact is the increasing power with which the arm $l$ operates in raising the follower. The power with which the link $h$ operates upon the main arm $i$ is also increased as the piston-rod advances, as this causes the link $h$ to act on the arm $i$ on the principle of the toggle-joint, the power of said link increasing as it approaches the position in which it is shown at the right hand of the figure, its maximum being when the link and arm form a right angle with each other. The frame $p\ p$ is made to raise and lower vertically by means of a shaft that crosses from one side of the machine to the other at $r\ r$, where the rods $o$ are connected to said frame, this shaft passing through the space $s\ s$ made in the head-block and frame. The lower part of the follower may have a slide or guide-piece, $t\ t$, passing into a suitable opening below it. As the bales received from different plantations differ in weight and size, it becomes necessary to adapt the press to these differences. The plan which I have devised of effecting this is the following: Instead of allowing the main shaft $j$ to have fixed bearings in the stands $k$ $k$, I place sliding boxes in said stands, which receive the gudgeons of the shaft, and are capable of being raised and lowered, and consequently of raising or lowering the follower. At the right-hand end of Fig. 1 the arrangement of this part is shown, and more distinctly in Fig. 5, where the principal operating parts of this apparatus are separately represented. In this last figure, $a'$ is a sliding box, on which the gudgeon of the shaft $j$ is sustained. This box rests upon a stud or support, $u$, the lower part, $u'$, of which forms an inclined plane. The box $a'$ and the stud $u$ are capable of descending within the stands $k$ $k$. Below the inclined bottom of $u$ there is a sliding wedge, $v$. This wedge is forced forward by means of a weight, $w$, acting on the jointed levers $x$ $x$, Figs. 1, 4, and 5. These levers have their fulcrums at $y$ in the stands $k$ $k$. Each of these levers is furnished with an offset that forces a bolt or pin, $z$, against the wedge $v$. The same provision is, of course, made under each of the gudgeons $j$. The weight $w$ is so graduated as to hold the wedge $v$ in place under the force to which the bale is ordinarily subjected; but if a bale contain more cotton than can be pressed into the space between the follower D and the head-block F the gudgeons $j$ will be thereby caused to press with increased force on the boxes $a$, and these, descending, will raise the weight $w$ by forcing the wedge $v$ back, and that in proportion to the resistance of the bale. The descent of the gudgeons will cause a corresponding descent in the follower through the intermedium of its frame $p', p$, and the self-adjustment will thus be effected.

Having thus fully described the manner in which I construct my balance steam-press and shown the operation of the same, what I claim therein as new, and desire to secure by Letters Patent, is—

1. The combination of the link $h$ with the arm $l$ and of the latter with the shaft $q$, by which the mechanical effect of the leverage is increased as the pressing proceeds.

2. The manner of regulating the rise of the follower to adapt it to bales of different sizes by a self-adjusting apparatus consisting of the sliding boxes for the gudgeons of the shaft $j$, the stud $u$, the inclined plane $v$, and the weight and jointed levers $w$ and $x$, arranged and operating substantially as set forth.

ALFRED C. JONES.

Witnesses:
ROBERT JONES,
CHAUNCEY BULKLEY.